(12) United States Patent
Hu

(10) Patent No.: US 10,702,918 B2
(45) Date of Patent: Jul. 7, 2020

(54) IRON-BASED COMPOSITE POWDER

(71) Applicants: HÖGANÄS AB (PUBL), Höganäs (SE); Bo Hu, Greensburg, PA (US)

(72) Inventor: Bo Hu, Greensburg, PA (US)

(73) Assignee: HÖGANÄS AB (PUBL), Höganäs (SE)

( * ) Notice: Subject to any disclaimer, the term of this patent is extended or adjusted under 35 U.S.C. 154(b) by 85 days.

(21) Appl. No.: 15/764,520

(22) PCT Filed: Sep. 29, 2016

(86) PCT No.: PCT/US2016/054364
§ 371 (c)(1),
(2) Date: Mar. 29, 2018

(87) PCT Pub. No.: WO2017/059026
PCT Pub. Date: Apr. 6, 2017

(65) Prior Publication Data
US 2018/0272423 A1  Sep. 27, 2018

(30) Foreign Application Priority Data

Sep. 29, 2015 (EP) .................................... 15187386

(51) Int. Cl.
| | |
|---|---|
| *B32B 5/16* | (2006.01) |
| *B22F 1/00* | (2006.01) |
| *C22C 33/02* | (2006.01) |
| *B22F 5/00* | (2006.01) |
| *B22F 1/02* | (2006.01) |
| *F16D 69/02* | (2006.01) |
| *F16D 65/092* | (2006.01) |
| *F16D 69/00* | (2006.01) |

(52) U.S. Cl.
CPC .......... *B22F 1/0014* (2013.01); *B22F 1/0059* (2013.01); *B22F 1/02* (2013.01);
(Continued)

(58) Field of Classification Search
CPC ............................................. C04B 2111/00362
See application file for complete search history.

(56) References Cited

U.S. PATENT DOCUMENTS

| 5,486,229 A | 1/1996 | An | |
|---|---|---|---|
| 2012/0160775 A1* | 6/2012 | Hu | ..................... B01J 20/28004 210/688 |
| 2016/0131215 A1* | 5/2016 | Alfani | ..................... C04B 28/04 106/36 |

FOREIGN PATENT DOCUMENTS

| EP | 2692876 A1 | 2/2014 |
|---|---|---|
| GB | 495824 A | 11/1938 |
| WO | 2012066352 A1 | 5/2012 |

OTHER PUBLICATIONS

Bo Hu, Friction Powder Metallurgy Materials, ASM Handbook, vol. 7, Powder Metallurgy, P. Samal and J. Newkirk, editors DOI: 10.31399/asm.hb.v07.a0006100 (Year: 2015).*

(Continued)

*Primary Examiner* — Hoa (Holly) Le
(74) *Attorney, Agent, or Firm* — Buchanan Ingersoll & Rooney P.C.

(57) ABSTRACT

A new iron-based powder containing a plurality of composite particles composed of a ferritic iron or iron-based porous 5 structural particles having at least one particulate friction modifier distributed in the pores and cavities of the structural particles and further containing at least one particulate stabilizer-sealer. The composite particle is especially suited to be used as a functional material in friction formulations such as brake pads and enable replacement of copper or copper-based materials used in such friction 10 material formulations.

24 Claims, 1 Drawing Sheet

(52) U.S. Cl.
CPC ............ *B22F 5/00* (2013.01); *C22C 33/0207* (2013.01); *F16D 65/092* (2013.01); *F16D 69/02* (2013.01); *B22F 1/007* (2013.01); *B22F 2001/0066* (2013.01); *B22F 2301/35* (2013.01); *F16D 69/026* (2013.01); *F16D 2069/002* (2013.01); *F16D 2200/0052* (2013.01); *F16D 2200/0069* (2013.01); *F16D 2250/00* (2013.01)

(56) References Cited

OTHER PUBLICATIONS

Google translation of JP-2007023314A (Year: 2007).*
Extended European Search Report dated Jun. 28, 2019, issued by the European Patent Office in corresponding European Application No. 16852568.1-1103, (7 pages).
International Search Report (PCT/ISA/210) dated Dec. 9, 2016, by the U.S. Patent Office as the International Searching Authority for International Application No. PCT/US2016/054364.
Written Opinion (PCT/ISA/237) dated Dec. 9, 2016, by the U.S. Patent Office as the International Searching Authority for International Application No. PCT/US2016/054364.
Office Action (The First Office Action) dated Jul. 26, 2019, by the State Intellectual Property Office (SIPO) of the People's Republic of China in corresponding Chinese Patent Application No. 201680069469. 8, and an English Translation of the Office Action. (12 pages).

\* cited by examiner

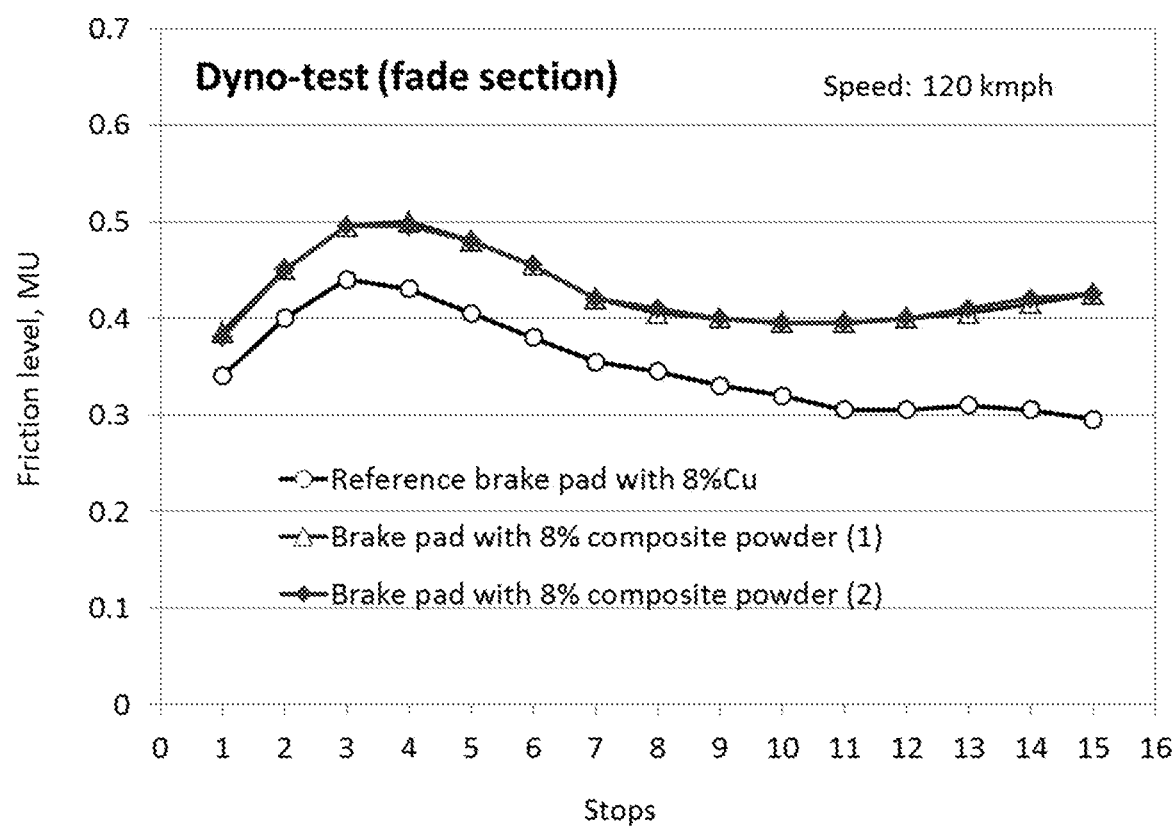

IRON-BASED COMPOSITE POWDER

TECHNICAL FIELD

Embodiments of the present invention relate to a new iron-based composite powder and the use of the powder in manufacturing friction materials. The composite powder is especially suited to be used as a functional material in friction formulations such as in brake pad formulations and enable replacement of copper or copper-based materials used in such friction material formulations.

BACKGROUND

Iron or iron-based powders are used in numerous applications and fields of technology. The powder particles with ability to form shaped bodies under pressure are utilized in production of pressed and sintered metal parts. Its chemical reactivity is utilized in various chemical processes. Iron or iron-based powders may also be used as additives in coatings of manual metal arc electrodes or in various friction materials, such as in brake pads.

A brake pad, and in particular the friction material of the brake pad for transportation vehicles, must fulfill a great number of requirements and also must satisfactory work in different environments, in wet and dry conditions, at high and low temperatures, at high thermal load etc. The friction material of a brake pad contains a great number of powdered substances, each of them playing an important role, either individually or in combination with other substances, the role however is not always possible to accurately define or quantify. For that reason, the development of friction materials for a brake pad is still very much based on trials and sometimes it is characterized as an art.

One substance frequently used in the friction material is copper powder, which among others play a role for the heat dissipation during braking and for the stable friction at high temperature environment.

However, the use of copper is being restricted in brake pads due to environment and health concerns. When the copper is removed from the brake pad formulation, great challenges are presented how to solve issues such as thermal fade or excessive pad and or rotor wear during use of the brake pad. Several attempts have been done to find a suitable replacement with limited success. For example, iron powder has been used as a replacement for copper but it has been encountered that hard and abrasive particles during the use of the brake pad can be formed, because graphite, a very common substance used in brake pad formulations, can diffuse into the iron to form cementite containing phases by the friction heat. The cementite containing phases are hard phases compared to the original iron powder that has a ferrite phase, a soft phase with hardness close to copper. Such hard phases can cause unstable friction and high pad and or rotor wear. Thus, there is a need to find suitable alternatives to replace the copper powder in brake pads.

SUMMARY

A first aspect of the invention discloses a powder containing a plurality of composite particles characterized in that said composite particle is composed of an iron or iron-based porous structural particle having at least one particulate friction modifier distributed in the pores and cavities of the structural particle, the composite particles further contain at least one stabilizer-sealer.

A second aspect of the present invention discloses a method for producing a powder according to the first aspect and a third aspect of the invention discloses the use of such powder. A further forth aspect of the invention discloses a brake pad containing the powder.

Specific embodiments of the various aspects of the present invention follow from the accompanying list of embodiments:

1. A powder containing a plurality of composite particles characterized in that said composite particle is composed of a ferritic iron or iron-based porous structural particle having at least one particulate friction modifier distributed in the pores and cavities of the structural particles and further containing at least one particulate stabilizer-sealer wherein the particulate friction modifier and the particulate stabilizer-sealer are in free form.
2. A powder according to embodiment 1 wherein the content of friction modifiers are 0.1-10% by weight, preferably 1-8% by weight, most preferably 2-6% by weight of the powder.
3. A powder according to any of embodiments 1-2 wherein the powder has a particle size distribution such that 100% is below 20 mesh (850 μm) and 90% is above 635 mesh (20 μm), preferably 100% is below 40 mesh (425 μm) and 90% is above 325 mesh (44 μm), most preferably 100% is below 60 mesh (250 μm) and 90% is above 325 mesh (44 μm).
4. A powder according to any of embodiments 1-3 wherein AD is between 1.2 and 2.5 g/cm$^3$.
5. A powder according to any of embodiments 1-4 having SSA between 1-30 m$^2$/g, preferably between 2-20 m$^2$/g.
6. A powder according to any of embodiments 1-5 wherein the ferrite content is 85% to 97% by weight, preferably 89% to 97 by weight.
7. A powder according to any of embodiments 1-6 wherein the particulate friction modifier is chosen from the groups of:
   carbon containing materials such as graphite, coke, coal, activated carbon, carbon black;
   minerals such as talc, mica, calcium fluorite; and
   other inorganic materials such as molybdenum disulfide ($MoS_2$), hexagonal boron nitride (h-BN), manganese sulfide (MnS), antimony sulfide ($SbS_3$ or $Sb_2S_5$).
8. A powder according to embodiment 7 wherein the friction modifier is chosen from graphite, talc, $MoS_2$, h-BN, MnS and $SbS_3$.
9. A powder according to any of embodiments 1-8 wherein the amount of particulate stabilizer-sealer is 0.1-5% by weight, preferably 1-3% by weight of the powder.
10. A powder according to any of embodiments 1-9 wherein the particulate stabilizer-sealer is chosen from the group of:
    clay minerals such as bentonite and kaolin;
    cement such as Portland cement;
    calcium oxide (CaO) and calcium hydroxide (Ca(OH)$_2$); and
    water glass such as sodium-potassium or lithium silicate.
11. A powder according to embodiment 10 wherein the stabilizer-sealer is chosen from bentonite, kaolin, Portland cement, calcium oxide, sodium silicate.
12. A method for producing a powder any of embodiments 1-11 comprising the steps of:
    a) providing a ferritic iron or iron based porous powder wherein the particle size of the iron or iron based porous powder is below 850 μm, preferably below 425 μm and minimum 90% of the particles is above 45 μm, preferably 90% of the particles is above 75 μm, and having apparent density (AD) between 1-2 g/cm$^3$, preferably between 1.2-1.8 g/cm$^3$ and, providing a friction modifier chosen from the group of:
carbon containing materials such as graphite, coke, coal, activated carbon, carbon black;
minerals such as talc, mica, calcium fluorite; and
other inorganic materials such as molybdenum disulfide (MoS2), hexagonal boron nitride (h-BN), manganese sulfide (MnS), antimony sulfide (SbS$_3$ or Sb$_2$S$_5$), b) mixing the iron or iron-based powder with 0.1-10% by weight, preferably 1-8% by weight, most preferably 2-6% by weight of the powder, with said friction modifier for a period of time of 1-30 minutes, c) providing a stabilizer-sealer chosen from the group of:
clay minerals such as bentonite and kaolin;
cement such as Portland cement;
calcium oxide (CaO) and calcium hydroxide (Ca(OH)$_2$; and
water glass such as sodium, potassium or lithium silicate, d) mixing 0.1-5% by weight, preferably 1-3% by weight of the powder, of said stabilizer-sealer with the mix obtained in step b) for a period of time of 1-30 minutes, e) optionally add 0.5-10% by weight, preferably 1-5% by weight of the powder of water and mix for a period of time of 1-30 minutes, f) subjecting the obtained mixture in step e) for a drying process at 50-150° C., preferably 75-125° C., g) recover the obtained powder, and step c) may be performed before step a) or may be performed before step b).

13. Use of a powder according to any of embodiments 1-11 for preparing components enhancing friction performance and preventing thermal fade.

14. Use of a powder according to embodiment 13 for preparation of friction material of a brake pad.

15. A brake pad containing a powder according to any of embodiments 1-11.

DETAILED DESCRIPTION

Preparation of the Powder According to Embodiments of the Present Invention and Raw Materials Used.
Iron- or Iron-Based Powder.

Iron or iron-based powder particles may be produced according to various technologies of production, rendering the finished powder particles various characteristics. Depending on the final use of iron or iron-based powders, certain characteristics are required.

The well-established water atomization method, wherein a stream of liquid iron with or without intentionally added alloying elements, is divided into finer particles by impinging the molten steam with high-pressure water jets, normally yields irregular dense particles with limited porosity. Such powder is well suited to be compacted into green components having high density. The following sintering process results in sintered components having high density with limited shrinkage. If the powder has too much shrinkage, it could negatively influence the dimensional accuracy of components.

Other processes such as chemical reduction of iron oxides with hydrogen gas, H$_2$, or chemical reduction of iron oxides with carbon containing materials, wherein the carbon containing materials to form carbon monoxide, CO, as a reduction gas, lead to powder particles with different characteristics. For instance, the CO reduction process results in a porous sponge iron cake, which after disintegration gives more irregular and more porous particles with some internal porosity. When used for producing compacted parts, such powder after compaction yields a green body having higher green strength but lower green density compared to the atomized iron powder.

Iron or iron powder particles produced through reduction of iron oxides with H$_2$-gas have even more porosity and more irregular shape with higher specific surface area compared to the atomized iron powder and CO-reduced iron powder. Powder containing porous and irregular particles has lower apparent density, AD, compared to those with shape that is more spherical.

The iron or iron-based powder particles contained in the composite powder according to the present invention have irregular and porous ferritic structure with a high degree of open porosity. The carbon content shall be less than 0.2% by weight. Ferritic structure, the ferritic metallurgical phase, in this context means that the ferrite content of the iron or iron-based powder is at least 90%, preferably at least 95% and most preferably at least 97% by weight, measured according to optical microstructure examination and microhardness vickers testing (ISO6507-1:2005).

The irregular and porous structure with a high degree of open porosity is evident by the low AD below 2.0 g/cm$^3$, such as 1-2.0 g/cm$^3$, preferably 1.2-1.8 g/cm$^3$, and the high specific surface area, SSA, in relation to its particle size distribution, such as 0.15-1 m$^2$/g, preferably 0.2-0.8 m$^2$/g as measured by a BET method according to the ISO 9277: 2010. The particle size distribution is chosen so that 100% of the particles have a diameter below 20 mesh (850 um), preferably below 40 mesh (425 um) and minimum 90% of the particles have a diameter above 325 mesh (45 um), preferably above 200 mesh (75 um) as measured according to ASTM E11. In this context, it is important to underline that it is the particular properties of the iron or iron-based powder particles used in the composite according to the present invention, which affects the properties of the composite. Thus, any other technique that provides the iron or iron-based powder particle properties similar to those mentioned above should be understood to be possible to be used in the composite according to the present invention.

In certain embodiments of the present invention, the iron powder particles contain alloying elements such as copper, nickel, molybdenum, chromium, silicon, zinc and aluminum rendering the final composite particles tailored properties. Such alloying elements may be pre-alloyed to the iron powder, i.e. added to the iron powder in the melt before atomization, or diffusion bonded to the iron powder, i.e. bonded to the surface of the iron powder by a thermal process. Alternatively, the alloying elements may be attached to the surface of the iron powder by means of a binder. The amount of alloying elements shall be less than 50% by weight.

Friction Modifier

At least one particulate friction modifier is combined with the iron or iron-based powder particles such that the particles of the friction modifier are placed into the pores and cavities of the iron or iron-based powder through a conventional mixing process. This mixing step may be performed in a standard mixing procedure such as in a ribbon mixer, a paddle mixer, high shear mixer, V-blender, double-cone blender and drum blender, etc. The time of mixing is set from 1 to 30 min depended on the type of mixer and the amount of friction modifier is used.

The amount of friction modifier is 0.1% to 10% by weight, preferably 1% to 8% by weight, more preferably 2% to 6% by weight.

The role of the friction modifier contained in the composite powder according to the present invention, is to adjust the friction characteristics of the iron powder so as to be in line with the corresponding characteristics of copper powder.

The friction modifier is chosen from the group of:
carbon containing materials such as graphite, coke, coal, activated carbon, carbon black
minerals such as talc, mica, calcium fluorite
other inorganic materials such as molybdenum disulfide ($MoS_2$), hexagonal-boron nitride (h-BN), manganese sulfide (MnS), antimony sulfide ($SbS_3$ or $Sb_2S_5$).

Preferred friction modifier are chosen from the group of graphite, talc, $MoS_2$, h-BN, MnS and $SbS_3$.

The particle size of the friction modifier is chosen so that the particles can be placed into the pore and cavities of the iron or iron-base powder particles through mixing. Thus, the particle size, measured according to ISO 13320:2009 (laser diffraction method), is $X_{50}$ below 8 μm and $X_{95}$ below 20 um, preferably $X_{50}$ below 5 um and $X_{95}$ below 15 um; more preferably $X_{50}$ below 3 um and $X_{95}$ below 10 um.

Stabilizer-Sealer

After the first mixing step wherein the friction modifier/s is combined with the iron or iron based powder particles, a second mixing step is performed wherein at least one particulate powder material acting as a stabilizer and sealer is added to the iron or iron-based powder/friction modifier combination. The second mixing procedure is carried out so that the stabilizer-sealer is in contact and covering at least a part of the surface of the friction modifier.

This second mixing step may be performed in a standard mixing procedure such as in a ribbon mixer, a paddle mixer, high shear mixer, V-blender, double-cone blender and drum blender, etc.

The time of mixing is set from 1 to 30 min depended on the type of mixer and the amount of stabilizer-sealer is used.

The amount of stabilizer-sealer is 0.1% to 5% by weight, preferably 1% to 3% by weight.

The stabilizer-sealer plays double roles in the present invention. The substance shall ensure that the friction modifier is kept inside the iron and iron-based powder. The stabilizer-sealer shall also prevent that carbon, e.g. in form of graphite contained in the friction material formulation and/or the graphite is used as a friction modifier, reacts with the iron contained in the composite powder according to the present invention, and forms cementite containing phases during use of the brake pad. Thus, the stabilizer-sealer prevents carbon diffusion into the iron matrix so that the iron powder can maintain its original ferritic phase, or austenitic phase when subjected to temperatures above the austenite forming temperature during friction.

The stabilizer-sealer chosen from the group of:
clay minerals such as bentonite and kaolin,
cement such as Portland cement,
calcium oxide (CaO) and calcium hydroxide ($Ca(OH)_2$,
water glass such as sodium, potassium or lithium silicate.

Preferably, the stabilizer-sealer is chosen from the group of: bentonite, kaolin, Portland cement, calcium oxide, and sodium silicate.

The particle size of the stabilizer-sealer is chosen so that the particles can be easily distributed on the surfaces of the iron or iron-base powder particles and further force the friction modifier(s) into the pore and cavities of the iron- or iron-base powder particles. Thus, the particle size, measured according to ISO 13320:2009 is $X_{50}$ below 8 μm and $X_{95}$ below 20 um, preferably $X_{50}$ below 5 um and $X_{95}$ below 15 um; more preferably $X_{50}$ below 3 um and $X_{95}$ below 10 um.

In order to further stabilize the composite powder particles according to the present invention a further production step may be applied, after the second mixing step, wherein the obtained powder containing the composite particles is subjected to a wet mixing step. This wet mixing step may be performed by adding water such as tap water or deionized water in a standard mixing procedure such as in a ribbon mixer, a paddle mixer, high shear mixer, V-blender, double-cone blender and drum blender, etc.

The time of mixing is set from 1 to 30 min depended on the type of mixer and the amount of water is used.

The amount of water is 0.5% to 10% by weight, preferably 1% to 5% by weight. After the wet mixing, the powder composite particles are dried at 50 to 150° C., preferably 75 to 125° C.

This wet and dry process further enhance the roles of stabilizer-sealer to ensure it to be evenly distributed and bonded on the surfaces of iron or iron-based powder particles. In one embodiment of the method according to the present invention the ferritic iron or iron-based structural particles are mixed with the friction modifier(s) and the stabilizer-sealer(s) at the same time, i.e. in one mixing step.

Characteristics of the Powder According to Embodiments of the Present Invention.

The powder according to the present invention is characterized by containing a plurality of composite particles having at least one particulate friction modifier distributed in the pores and cavities of iron or iron-based structural particles. The iron or iron-based structural particles further contain at least one particulate stabilizer-sealer. The iron or iron based structural particles are ferritic, or austenitic when subjected to temperatures above the austenite forming temperature. The content of friction modifiers are 0.1% to 10% by weight, preferably 1% to 8% by weight, most preferably 2% to 6% by weight of the powder. The amount of stabilizer-sealer is 0.1% to 5% by weight, preferably 1% to 3% by weight of the powder. The ferrite content of the composite particles is 85% to 97% by weight, preferably 89% to 97% by weight.

Both the friction modifier(s) and the stabilizer-sealer(s) are in free form, i.e. they are not chemically combined with the iron and iron based powder and can be separated from the iron or iron-base powder particles with physical separation methods such as ultrasonic water and/or solvent washing. The particles of the friction modifier(s) and stabilizer-sealer(s) are not embedded in the matrix of the iron or iron-based powder particles but present on, or bonded to, the surface of the iron or iron-based powder particles with cohesive forces.

Further, in embodiments according to the present invention the particle size distribution of the powder is such that 100% is below 20 mesh (850 μm) and 90% is above 635 mesh (20 μm), preferably 100% is below 40 mesh (425 μm) and 90% is above 325 mesh (44 μm), most preferably 100% is below 60 mesh (250 μm) and 90% is above 325 mesh (44 μm).

In an embodiment AD of the powder is between 1.2 and 2.5 g/cm³.

In other embodiments the powder may have a specific surface area of between 1-30 m²/g, preferably between 2-20 m²/g.

BRIEF DESCRIPTION OF THE FIGURE

FIG. 1 shows result from dynamometer test of reference brake pad and brake pads containing the powder composite particles according to an embodiment of the present invention.

EXAMPLES

Apparent density, AD, was measured according to MPIF standard test method for metal powders and powder metallurgy products No. 03:2012.

Specific Surface AREA, SSA, was measured according to ISO 9277:2010 BET method.

$X_{50}$ and $X_{95}$ was measured according to ISO 13320:2009 laser diffraction method.

Flow was measured according to MPIF standard test method for metal powders and powder metallurgy products No. 02:2012.

Hardness was measured according to MPIF standard test method for metal powders and powder metallurgy products No. 43:2012.

Strength was measured according to MPIF standard test method for metal powders and powder metallurgy products No. 41:2012.

Example 1

Preparation of the powder composite particles.

1000 grams of porous hydrogen ($H_2$) reduced iron powder having an iron content more than 98% was mixed with 50 grams of graphite in a paddle mixer for a period of 10 minutes. After this first mixing step, 30 grams of a clay mineral, bentonite, was added to the mixer and further mixed for a period of 6 minutes. 25 ml of water was thereafter sprayed into the mixer during mixing and continue to mix for a period of 5 minutes. After the wet mixing, the powder composite particles are dried at 60° C. for 2 hours.

The following table 1 shows the properties of the iron powder, the graphite and the clay used.
Properties of Materials Used for Producing the Powder Composite Particles

TABLE 1

|  | Iron powder | Graphite | Clay |
|---|---|---|---|
| AD [g/cm³] | 1.43 | 0.09 | 0.34 |
| SSA [m²/g] | 0.25 | 250 | 75 |
| $X_{50}$ [μm] | — | 2.0 | 3.5 |
| $X_{95}$ [μm] | — | 9.4 | 10.0 |
| Flow [s/25 g] | 33.5 | No flow | No flow |
| Sieve analysis |  |  |  |
| +40 mesh (+420 μm) [%] | 0 | N.A. | N.A. |
| +100 mesh (+149 μm) [%] | 65.5 | N.A. | N.A. |
| +200 mesh (+74 μm) [%] | 26.0 | N.A. | N.A. |
| −200 mesh (−74 μm) [%] | 8.5 | N.A. | N.A. |

The following table 2 shows the properties of the iron powder used, the intermediate products and the final composite powder (1).

TABLE 2

|  | Iron powder | After first mixing | After second mixing | Composite powder (1) |
|---|---|---|---|---|
| AD [g/cm³] | 1.43 | 1.51 | 1.49 | 1.62 |
| SSA [m²/g] | 0.25 | 12.7 | 14.9 | 13.7 |
| Flow [s/25 g] | 33.5 | No flow | No flow | 28.3 |
| Sieve analysis |  |  |  |  |
| +40 mesh (+420 μm) [%] | 0 | 0 | 0 | 0 |
| +100 mesh (+149 μm) [%] | 65.5 | 65.4 | 66.0 | 60.0 |
| +200 mesh (+74 μm) [%] | 26.0 | 25.4 | 24.2 | 28.5 |
| −200 mesh (−74 μm) [%] | 8.5 | 9.2 | 9.8 | 11.5 |

As can be seen from table 2, there is no significant change in particle size distribution between the iron powder used and the final composite powders. Compared to the intermediate products that are unable to flow freely due to the fine additive addition, the composite powder exhibits a good flow rate indicating that the stabilizer-sealer was successfully coated on the surface of iron particles to seal the friction modifier inside of iron particles through the wet and dry process. A good flow rate also facilitates handling of the powder and manufacture of the friction material. AD is changed to a minor degree indicating that the powder composite particles maintain its particle morphology. Due to the addition of friction modifier and stabilizer-sealer, however, the SSA of the final composite powder is greatly increased compared to the iron powder. The improved flow, similar AD and particle size distribution, and increased SSA were the evidence for the composite powder constructed well with the friction modifier and stabilizer-sealer.

Example 2

A second composite powder, composite powder (2), was prepared according to the procedure described in EXAMPLE 1 with the exception of that instead of 50 grams of the graphite as friction modifier, 40 grams of the same type of graphite and 10 grams of hexagonal boron nitride was used. Table 3 shows the properties of the hexagonal boron nitride.

TABLE 3

|  | h-BN |
|---|---|
| AD [g/cm³] | 0.16 |
| SSA [m²/g] | 12.5 |
| $X_{50}$ [μm] | 0.9 |
| $X_{95}$ [μm] | 6.5 |

Properties of the intermediate products and the final composite powder, composite powder (2) was measured, results of the measurements according to table 4.

TABLE 4

|  | Iron powder | After first mixing | After second mixing | Composite powder (1) |
|---|---|---|---|---|
| AD [g/cm³] | 1.43 | 1.53 | 1.50 | 1.65 |
| SSA [m²/g] | 0.25 | 10.4 | 12.6 | 11.9 |
| Flow [s/25 g] | 33.5 | No flow | No flow | 30.1 |
| Sieve analysis |  |  |  |  |
| +40 mesh (+420 μm) [%] | 0 | 0 | 0 | 0 |
| +100 mesh (+149 μm) [%] | 65.5 | 66.4 | 66.1 | 65.2 |

TABLE 4-continued

|  | Iron powder | After first mixing | After second mixing | Composite powder (1) |
|---|---|---|---|---|
| +200 mesh (+74 μm) [%] | 26.0 | 24.7 | 24.8 | 25.8 |
| −200 mesh (−74 μm) [%] | 8.5 | 8.9 | 9.1 | 9.0 |

As can be seen from table 4, there is no significant change in particle size distribution between the iron powder used and the final composite powders. Compared to the intermediate products that are unable to flow freely due to the fine additive addition, the composite powder exhibits a good flow rate indicating that the stabilizer-sealer was successfully coated on the surface of iron particles to seal the friction modifier inside of iron particles through the wet and dry process. A good flow rate also facilitates handling of the powder and manufacture of the friction material. AD is changed to a minor degree indicating that the powder composite particles maintain its particle morphology. Due to the addition of friction modifier and stabilizer-sealer, however, the SSA of the final composite powder is greatly increased compared to the iron powder. The improved flow, similar AD and particle size distribution, and increased SSA were the evidence for the composite powder constructed well with the friction modifier and stabilizer-sealer.

Example 3

A third composite powder, composite powder (3), was prepared according to the procedure described in EXAMPLE 1 with the exception of that instead of 50 grams of the graphite as friction modifier, 70 grams of manganese sulfide (MnS) and 30 grams of mica was used. Table 5 shows the properties of the manganese sulfide and the mica.

TABLE 5

|  | MnS | Mica |
|---|---|---|
| AD [g/cm³] | 1.02 | 0.21 |
| SSA [m²/g] | 1.3 | 9.3 |
| $D_{50}$ [μm] | 5.6 | 4.9 |
| $D_{95}$ [μm] | 8.8 | 14.3 |

Properties of the intermediate products and the final composite powder, composite powder (3) was measured, results of the measurements according to table 6.

TABLE 6

|  | Iron powder | After first mixing | After second mixing | Composite powder (1) |
|---|---|---|---|---|
| AD [g/cm³] | 1.43 | 1.55 | 1.53 | 1.71 |
| SSA [m²/g] | 0.25 | 0.59 | 2.84 | 2.34 |
| Flow [s/25 g] | 33.5 | No flow | No flow | 27.2 |
| Sieve analysis |  |  |  |  |
| +40 mesh (+420 μm) [%] | 0 | 0 | 0 | 0 |
| +100 mesh (+149 μm) [%] | 65.5 | 61.0 | 60.2 | 62.9 |
| +200 mesh (+74 μm) [%] | 26.0 | 28.4 | 27.3 | 27.3 |
| −200 mesh (−74 μm) [%] | 8.5 | 10.6 | 12.5 | 9.8 |

As can be seen from table 6, there is no significant change in particle size distribution between the iron powder used and the final composite powders. Compared to the intermediate products that are unable to flow freely due to the fine additive addition, the composite powder exhibits a good flow rate indicating that the stabilizer-sealer was successfully coated on the surface of iron particles to seal the friction modifier inside of iron particles through the wet and dry process. A good flow rate also facilitates handling of the powder and manufacture of the friction material. AD is changed to a minor degree indicating that the powder composite particles maintain its particle morphology. The SSA of the final composite powder is also increased compared to the iron powder due to the addition of friction modifiers and stabilizer-sealer. The improved flow, similar AD and particle size distribution, and increased SSA were the evidence for the composite powder constructed well with the friction modifier and stabilizer-sealer.

Example 4

Evaluation on Phase Stability of Composite Powder

The composite powder 1 and composite powder 2 obtained in EXAMPLE 1 and 2 were used to evaluate their ferritic phase stability at elevated temperature compared to the iron powder with and without graphite addition. After mixed with 1% by weight Acrawax C as a compaction lubricant, the powder mix was compacted into transverse rupture strength (TRS) specimen at 6.5 g/cm³ according to MPIF standard test method for metal powders and powder metallurgy products No. 41:2012. The compacted samples were then heated at 900° C. and 1120° C. respectively in 100% nitrogen atmosphere for 30 minutes. After the heated samples were cooled to room temperature, hardness, according to MPIF standard test method for metal powders and powder metallurgy products No. 43:2012, and strength, according to MPIF standard test method for metal powders and powder metallurgy products No. 41:2012, of each heated material were measured. The results were shown in table 7.

TABLE 7

| Material | Composite powder 1 (invention) | Composite powder 2 (invention) | Iron powder only (reference) | Iron powder + 0.8% graphite (reference) |
|---|---|---|---|---|
| Graphite content (%) | 5.0 | 4.0 | <0.05 | 0.8 |
| 900° C. heated |  |  |  |  |
| Hardness | 34 HRH | 36 HRH | 37 HRH | 96 HRH |
| Strength (MPa) | 35 | 28 | 56 | 294 |
| 1120° C. heated |  |  |  |  |
| Hardness | 33 HRF | 19 HRF | 35 HRF | 62 HRB |
| Strength (MPa) | 70 | 77 | 105 | 532 |

As can be seen from table 7, the composite powders presented similar hardness and strength compared to the iron powder without graphite addition, indicating that the composite powders still maintain the ferritic phase well, even it contained large amount of graphite and heat treated at 900° C. and 1120° C. respectively. For the iron powder with 0.8% graphite addition, however, it showed much harder and much higher strength than the composite powders due to the diffusion of carbon from added graphite to form cementite containing phase. The tests provided evidence for the composite powders according to the present invention having stable ferritic phase, or austenitic phase in the structural iron powder when subjected to temperatures up to 1120° C.

Example 5

Preparation and Testing of Friction Materials

A typical non-asbestos organic (NAO) brake pad formulation was selected for friction tests. This formulation contains 8% by weight copper powder together with binder, lubricants, abrasives, fillers, etc. various powdered materials according to the following table 8, as reference friction material. The same powdered materials as used for preparation of the reference material were used for preparing the test friction materials with the exception of that copper powder were fully replaced with composite powder 1 and composite powder 2, in the same amount by weight, respectively. The composite powder 1 and composite powder 2 were made from EXAMPLE 1 and 2 respectively. Other powdered materials include phenolic resin, cashew nut shell oil, graphite, antimony trisulfide, zirconium silicate, aluminum silicate, magnetite, mica, potassium titanate, rubber, aramid fiber, barytes.

TABLE 8

Compositions of friction material (% by weight)

| NAO formulations | Reference material | Material containing composite powder (1) | Material containing composite powder (2) |
|---|---|---|---|
| Binders (%) | 18 | 18 | 18 |
| Lubricants (%) | 12 | 12 | 12 |
| Abrasives (%) | 33 | 33 | 33 |
| Fillers (%) | 29 | 29 | 29 |
| Copper powder (%) | 8 | — | — |
| Composite powder (1) or (2) (%) | — | 8 | 8 |

All powdered materials including the copper and the composite powders were weighed accurately according to their designated amount, added into a vertical mixer for mixing and mixed for 15 minutes. A total of 2 kg mixed material was made for each mix. The mixes were then loaded into a brake pad mold, which fits the Ford Crown Victoria (1999) test assembly on the full-scale dynamometer. The molded brake pad samples were hot pressed for 15 minutes at 175° C. and post cured in an oven at 180° C. for 4 hours.

Friction Test

The produced brake pad samples were tested on a single-ended inertial type brake dynamometer using SAE J2430 procedure. Original equipment manufacturer (OEM) grade cast iron disc rotors and calipers were used in the tests. Based on the full-scale dynamometer test results, a Brake Effectiveness Evaluation Procedure (BEEP) was used to evaluate the friction performances. The BEEP evaluation results are shown in table 9.

TABLE 9

| BEEP criteria | Min | Max | Reference pad (8% Cu) | Pad containing 8% composite powder (1) | Pad containing 8% composite powder (2) |
|---|---|---|---|---|---|
| Effectiveness space [Nm/kPa] | 0.179 | 0.473 | 0.36 | 0.35 | 0.30 |
| Cold effectiveness [N] | | 500 | 203 | 170 | 204 |
| Fade snubs [N] | | 500 | 94 | 68 | 64 |
| Hot performance S1 [Nm] | 1073 | | 1097 | 1605 | 1691 |
| Hot performance S2 [Nm] | 1367 | | 2575 | 3396 | 3685 |
| Structural integrity [%] | 90 | | 100 | 100 | 100 |
| Overall assessment | | | pass | pass | pass |

As evident from table 9, all tested brake pads passed the test. It can also be noted that brake pads containing the composite particles according to the present invention even exceeded the performance of the reference brake pad related to some aspects such as hot performances.

Thermal Fade Resistance Test

The SAE J2430 full-scale dynamometer tests also evaluated thermal fade resistance of the brake pad samples. Thermocouples were embedded below the friction surface of brake pad samples. The brake pads were subjected to make repeated stops at a speed of 120 km per hour without the brake assembly was cooled so that the temperature increased from 50° C. at the start to 325° C. at the end of test FIG. 1 shows the thermal fade test results. It is evident that the brake pads containing the composite particles according to the present invention have good Thermal Fade Resistance, which even exceeds the reference material.

Wear Test

The SAE J2430 full-scale dynamometer tests also evaluated the brake pads and disc wear after the tests were completed. The thickness and weight of the brake pad samples and disc rotor were accurately measured prior to and after the test. Table 10 shows the results of wear for each tested brake pad samples.

TABLE 10

| | Reference pad (8% Cu) | Pad containing 8% composite powder (1) | Pad containing 8% composite powder (2) |
|---|---|---|---|
| Inboard pad, | | | |
| thickness loss [mm] | 0.75 | 0.68 | 0.53 |
| Weight loss [g] | 6.10 | 1.13 | 1.26 |
| Outboard pad, | | | |
| thickness loss [mm] | 0.47 | 0.63 | 0.56 |
| Weight loss [g] | 4.3 | 1.00 | 1.00 |
| Rotor wear | | | |
| thickness loss [mm] | 0.035 | 0.026 | 0.011 |

Compared to the reference pad, the composite containing brake pads exhibits similar pad wear in thickness but much less weight loss in both inboard and outboard pad, and less wear in the disc rotor.

The invention claimed is:

1. A powder comprising a plurality of composite particles wherein said composite particle is composed of an iron or iron- based porous structural particle having a ferritic structure,
the composite particle having at least one particulate friction modifier distributed in the pores and cavities of the structural particles and further comprising at least one particulate stabilizer-sealer, wherein the particulate friction modifier and the particulate stabilizer-sealer are in free form.

2. The powder according to claim 1 wherein the content of friction modifiers are 0.1-10% by weight of the powder.

3. The powder according to claim 1 wherein the content of friction modifiers are 2-6% by weight of the powder.

4. The powder according to claim 1 wherein the powder has a particle size distribution such that 100% is below 20 mesh (850 μm) and 90% is above 635 mesh (20 μm).

5. The powder according to claim 1 wherein the powder has a particle size distribution such that 100% is below 60 mesh (250 μm) and 90%>is above 325 mesh (44 μm).

6. The powder according to claim 1 wherein AD is between 1.2 and 2.5 $g/cm^3$.

7. The powder according to claim 1 having SSA between 1-30 $m^2/g$.

8. The powder according to claim 1 having SSA between 2-20 $m^2/g$.

9. The powder according to claim 1 wherein the amount of the composite particle with ferritic structure is 85% to 97% by weight.

10. The powder according to claim 1 wherein the particulate friction modifier is chosen from the groups of:
carbon containing materials selected from graphite, coke, coal, activated carbon, carbon black;
minerals selected from talc, mica, calcium fluorite; and
other inorganic materials selected from molybdenum disulfide ($MoS_2$), hexagonal boron nitride (h-BN), manganese sulfide (MnS), antimony sulfide ($SbS_3$ or $Sb_2S_5$).

11. The powder according to claim 10 wherein the friction modifier is chosen from graphite, talc, $MoS_2$, h-BN, MnS and SbSs.

12. The powder according to claim 1 wherein the amount of particulate stabilizer-sealer is 0.1-5% by weight of the powder.

13. The powder according to claim 1 wherein the amount of particulate stabilizer-sealer is 1-3% by weight of the powder.

14. The powder according to claim 1 wherein the particulate stabilizer-sealer is chosen from the group of:
clay minerals,
cement,
calcium oxide (CaO) and calcium hydroxide ($Ca(OH)_2$, and
water glass.

15. The powder according to claim 14 wherein the stabilizer-sealer is chosen from bentonite, kaolin, Portland cement, calcium oxide, and sodium silicate.

16. A component prepared from the powder according to claim 1.

17. The component according to claim 16, wherein the component is friction material of a brake pad.

18. A brake pad containing a powder according to claim 1.

19. A method for producing the powder of claim 1 comprising the steps of
a) providing an iron or iron based porous powder comprising a plurality of particles, wherein the particle is composed of an iron or iron- based porous structural particle having a ferritic structure, wherein the particle size of the iron or iron based porous powder is below 850 μm, and a minimum of 90% of the particles is above 45 μm, and having apparent density (AD) between 1-2 $g/cm^3$, and
providing a friction modifier chosen from the group of:
carbon containing materials selected from graphite, coke, coal, activated carbon, carbon black;
minerals selected from talc, mica, calcium fluorite; and
other inorganic materials selected from molybdenum disulfide ($MoS_2$), hexagonal boron nitride (h-BN), manganese sulfide (MnS), antimony sulfide ($SbS_3$ or SbjSa),
b) mixing the iron or iron-based powder with 0.1-10% by weight of the powder, with said friction modifier for a period of time of 1-30 minutes,
c) providing a stabilizer-sealer chosen from the group of:
clay minerals;
cement;
calcium oxide (CaO) and calcium hydroxide ($Ca(OH)_2$; and
water glass,
d) mixing 0.1-5% by weight of the powder, of said stabilizer-sealer with the mix obtained in step b) for a period of time of 1-30 minutes,
e) optionally adding 0.5-10% by weight of the powder of water and mixing for a period of time of 1-30 minutes,
f) subjecting the obtained mixture in step e) for a drying process at 50-150° C.,
g) recovering the obtained powder, and step c) may be performed before step a) or may be performed before step b).

20. The method of claim 19, wherein in step a) a minimum of 90% of the particles is above 75 μm, wherein the apparent density (AD) is between 1.2-1.8 $g/cm^3$.

21. The method of claim 19, in step b) mixing the iron or iron-based powder with 2-8% by weight of the powder, with said friction modifier for a period of time of 1-30 minutes.

22. The method of claim 19, in step d) mixing 1-3% by weight of the powder, of said stabilizer-sealer with the mix obtained in step b) for a period of time of 1-30 minutes.

23. The method of claim 19, in step e) adding 1-5% by weight of the powder of water and mixing for a period of time of 1-30 minutes.

24. The method of claim 19, in step f) subjecting the obtained mixture in step e) for a drying process at 75-125° C.

* * * * *